(12) United States Patent
Janovici et al.

(10) Patent No.: US 6,701,595 B2
(45) Date of Patent: Mar. 9, 2004

(54) CLAMP CONNECTION AND RELEASE DEVICE

(76) Inventors: Dennis S. Janovici, 1023 Pleasant View Ave., Venice, CA (US) 90291; Anthony Zahn, Jr., 1021 Gladiola Way, Henderson, NV (US) 89015; Robert White, 588 Kennerly St., Henderson, NV (US) 89015; Matt Sweeney, 11561 Kelsey St., Studio City, CA (US) 91604

( * ) Notice: Subject to any disclaimer, the term of this patent is extended or adjusted under 35 U.S.C. 154(b) by 0 days.

(21) Appl. No.: 09/894,930

(22) Filed: Jun. 28, 2001

(65) Prior Publication Data

US 2003/0002917 A1 Jan. 2, 2003

(51) Int. Cl.$^7$ ............................................. B25B 27/14
(52) U.S. Cl. ........................... 29/272; 29/238; 29/239; 29/243.517; 29/267; 29/426.5
(58) Field of Search ......................... 29/234, 237, 238, 29/239, 243.517, 267, 272, 280, 426.5, 426.6, 464, 525, 747, 748, 750, 752, 758, 760, 764

(56) References Cited

U.S. PATENT DOCUMENTS

| | | | | |
|---|---|---|---|---|
| 2,441,756 A | * | 5/1948 | De Swart | 29/282 |
| 2,478,886 A | * | 8/1949 | De Swart | 29/243.529 |
| 2,920,383 A | * | 1/1960 | Aydelott | 29/237 |
| 2,958,125 A | * | 11/1960 | Nichols | 29/237 |
| 3,281,929 A | * | 11/1966 | Shinnick | 29/237 |
| 3,323,201 A | * | 6/1967 | Fisher | 29/238 |
| 3,414,961 A | * | 12/1968 | Bjalme | 29/237 |
| 4,598,452 A | * | 7/1986 | Iseki | 29/237 |
| 4,722,468 A | * | 2/1988 | McClure | 228/49.3 |
| 4,872,709 A | * | 10/1989 | Stack | 285/39 |
| 4,893,393 A | | 1/1990 | Marshall | |
| 5,074,031 A | * | 12/1991 | Werner | 29/747 |
| 5,099,561 A | * | 3/1992 | Santiago Lozano | 29/237 |
| 5,226,231 A | * | 7/1993 | De Leebeeck | 29/237 |
| 5,513,425 A | * | 5/1996 | Williams | 29/237 |
| 5,640,748 A | * | 6/1997 | Harrison | 29/272 |
| 5,649,357 A | * | 7/1997 | Chapman et al. | 29/861 |
| 5,749,604 A | * | 5/1998 | Williams | 285/39 |
| 6,195,862 B1 | * | 3/2001 | Chang | 29/237 |
| 6,272,738 B1 | * | 8/2001 | Holliday et al. | 29/751 |
| 6,314,629 B1 | * | 11/2001 | Showalter, Sr. et al. | 29/237 |
| 6,327,763 B2 | * | 12/2001 | Stephen | 29/272 |
| 6,389,675 B1 | * | 5/2002 | Tykoski et al. | 29/468 |

* cited by examiner

*Primary Examiner*—Gregory Vidovich
*Assistant Examiner*—Essama Omgba
(74) *Attorney, Agent, or Firm*—Colin P. Abrahams

(57) ABSTRACT

A clamp for an inline connector having a male and a female component comprises a first sleeve having a peripheral portion defining an opening for receiving and holding the male or female component. A second sleeve is provided adjacent the first sleeve and has an opening therein which is adjacent the opening in the first sleeve. A handle having a first end is pivotally connected to the first sleeve for rotation about the pivotal connection. A bracket is pivotally connected to the second sleeve member at one end thereof and pivotally connected to the handle at another end thereof. Rotation of the handle about its pivotal connection to the first sleeve moves the first sleeve and the second sleeve relative to each other between a first position where the first sleeve and the second sleeve are closer to each other and a second position where the first sleeve and the second sleeve are further apart from each other.

13 Claims, 5 Drawing Sheets

CLAMP CONNECTION AND RELEASE DEVICE

FIELD AND BACKGROUND OF THE INVENTION

This invention relates to a clamp connection and release device. More particularly, the invention is for a clamp connection and release device for inline connections for cables, plugs and sockets, electrical connections, as well as hydraulic and pneumatic connections. These connections are generally referred to as couplings.

There are many instances where it is necessary to connect couplings, for subsequent easy release, in order to form an electric or other connection between, for example, a switch or power source and a device which it activates. In one application, when a trailer is connected to a truck or tractor, it is not only necessary to ensure the physical connection between the truck and trailer, but, additionally, electrical or other components in the trailer, which must be operated by the operator in the truck, need to be secured. Therefore, all lighting, air conditioning, hydraulic and electrical connections must be established between the truck and trailer for proper and safe operation.

In conventional systems, it is typical for a truck to have a socket or outlet conveniently located, usually at the back thereof, the socket or outlet being provided with connectors of various types. Such connectors may be of an electrical type, such as those required to connect the truck with lighting or air conditioning systems in an attached trailer, or of an hydraulic type, to connect the truck's systems with that of the trailer's. An example of such a coupling is the braking system. When the trailer is physically connected to the truck so as to be drawn thereby, a plug or corresponding device from the trailer is releasably inserted into the plug or outlet located on the truck, so as to establish the necessary electrical, hydraulic or other (such as pneumatic) connections, as appropriate. Thus, the main physical connection of the truck to the trailer is conventionally established by what is typically described as a multiple pole electrical plug and socket, and, thereafter, the various systems of the truck and trailer are connected for appropriate communication between truck and trailer.

When inserting the plug or other type of connector on the trailer into the socket or outlet of the truck, it is, of course, important that the connection be a very secure one so as to be able to withstand the normal motion, vibrations and sudden movements which may occur under typical, and even severe, driving conditions. For this reason, the plug connection from the trailer to the socket or outlet of the truck is usually a very firm one, often requiring a significant amount of force to disconnect the two. Moreover, the connections may be located at positions which are difficult to access, making maneuverability by the operator difficult for the purposes of separating the plug from the socket.

SUMMARY OF THE INVENTION

According to one aspect of the invention, there is provided a clamp for an inline connector having a male and a female component, the clamp comprising: a first sleeve member having a peripheral portion defining an opening for receiving and holding the male or female component; a second sleeve member adjacent the first sleeve member, the second sleeve member having an opening therein which is adjacent the opening in the first sleeve member; a handle having a first end pivotally connected to the first sleeve member for rotation about the pivotal connection; a bracket member pivotally connected to the second sleeve member at one end thereof and pivotally connected to the handle at another end thereof; wherein rotation of the handle about its pivotal connection to the first sleeve member moves the first sleeve member and the second sleeve member relative to each other between a first position where the first sleeve member and the second sleeve member are closer to each other and a second position where the first sleeve member and the second sleeve member are further apart from each other.

Preferably, the first sleeve member is a ring member and defines a circular opening for receiving and holding the male or female component, and the second sleeve member is of a cylindrical shape and defines a circular opening adjacent the circular opening of the ring member.

The handle may comprise a pair of parallel end portions each of which connect at one end thereof pivotally to the first sleeve member, a pair of tapering portions extending from the end portions, and a pair of parallel handle portions extending from the tapering portions, the handle portions being connected to each other at ends thereof remote from the tapering portions by a U-shaped member. Preferably, the first sleeve member has a pair of threaded bores therein each of which registers with one of the apertures, and a bolt connects the end portion to the first sleeve member by passing through the aperture of the end portion and threadedly engaging the threaded bore in the first sleeve member.

The tapering portions may be downwardly angled with respect to the handle portions, and the end portions are downwardly angled with respect to the tapering portions.

Preferably, the bracket member comprises a pair of parallel first end portions each of which connect at one end thereof pivotally to the second sleeve member, a pair of tapering portions extending from the end portions, and a pair of parallel second end portions extending from the tapering portions. Conveniently, each first end portion of the bracket member has an aperture therein, the second sleeve member has a pair of threaded bores therein each of which registers with one of the apertures, and a bolt connects the first end portion to the second sleeve member by passing through the aperture of the first end portion and threadedly engaging the threaded bore in the second sleeve member. The tapering portions may be downwardly angled with respect to the second end portions, and the first end portions are linear with respect to the tapering portions.

According to another aspect of the invention, there is provided a clamp comprising: a housing member defining an opening for receiving and holding a component; an abutment member adjacent the housing member; a handle having a first end pivotally connected to the housing member; a bracket member pivotally connected to the abutment member at one portion thereof and pivotally connected to the handle at another portion thereof; wherein rotation of the handle about its pivotal connection to the housing member moves the housing member and the abutment member relative to each other between a first position and a second position where the housing member and the abutment member are further apart from each other than in the first position.

According to yet a further aspect of the invention, there is provided a method for connecting and disconnecting an inline coupling having a male and female component, the method comprising: locating a first sleeve member, having a peripheral portion defining an opening for receiving and holding the male or female component, adjacent a second sleeve member, the second sleeve member having an opening therein adjacent the opening in the first sleeve member; pivotally connecting a handle having a first end to the first sleeve member for rotation about the pivotal connection; pivotally connecting a bracket member to the second sleeve member at one end thereof and to the handle at another end thereof; and rotating the handle about its pivotal connection to the first sleeve member to move the first sleeve member and the second sleeve member relative to each other between a first position where the first sleeve member and the second sleeve member are closer to each other and a second position where the first sleeve member and the second sleeve member are further apart from each other.

The clamp connector and release device facilitates connection and easy release between a pair of registering connectors, such as a plug and a socket, thereby providing an inline connection which can be established and released as needed.

The clamp of the invention has particular application when used between a truck and trailer, whereby the various systems and devices on a trailer, such as lighting, air conditioning, braking and other systems, may be connected to the truck so that they can be operated from the truck. The clamp of the invention may establish inline connections of electrical, hydraulic or pneumatic type, and is designed so as to facilitate the connection, and, most importantly, allow ease or efficiency with respect to the release, since the plug and socket connection may often be tight fitting and require a significant amount of force to separate.

While the invention has as an important application in the connection of systems between a truck and trailer, the invention is not to be construed as being limited in this regard. The clamp of the invention may be useful and applicable in any situation where a plug may be connected to a socket, since the clamp of the invention significantly facilitates ease of separation so that the plug can be released or withdrawn from the socket.

In one aspect, the invention comprises a sleeve and associated ring which can be moved towards or away from each other, by the appropriate turning or movement of a handle, so that when the ring and sleeve portion are separated, the plug or connector will be removed from the socket.

It will be appreciated that the clamp of the invention can be used to establish a connection, as well as to disconnect, the plug or connector end of a cable, tube, or the like, irrespective of its connector characteristics. In other words, the clamp may be connected to a plug end, socket end, or any other type or combination of these elements.

DETAILED DESCRIPTION OF THE INVENTION

Reference is now made to the drawings accompanying this application, which show various views of the clamp connector and release device of the invention, in different views, as well as the elements and components which make up the clamp.

Figures 1, 2:
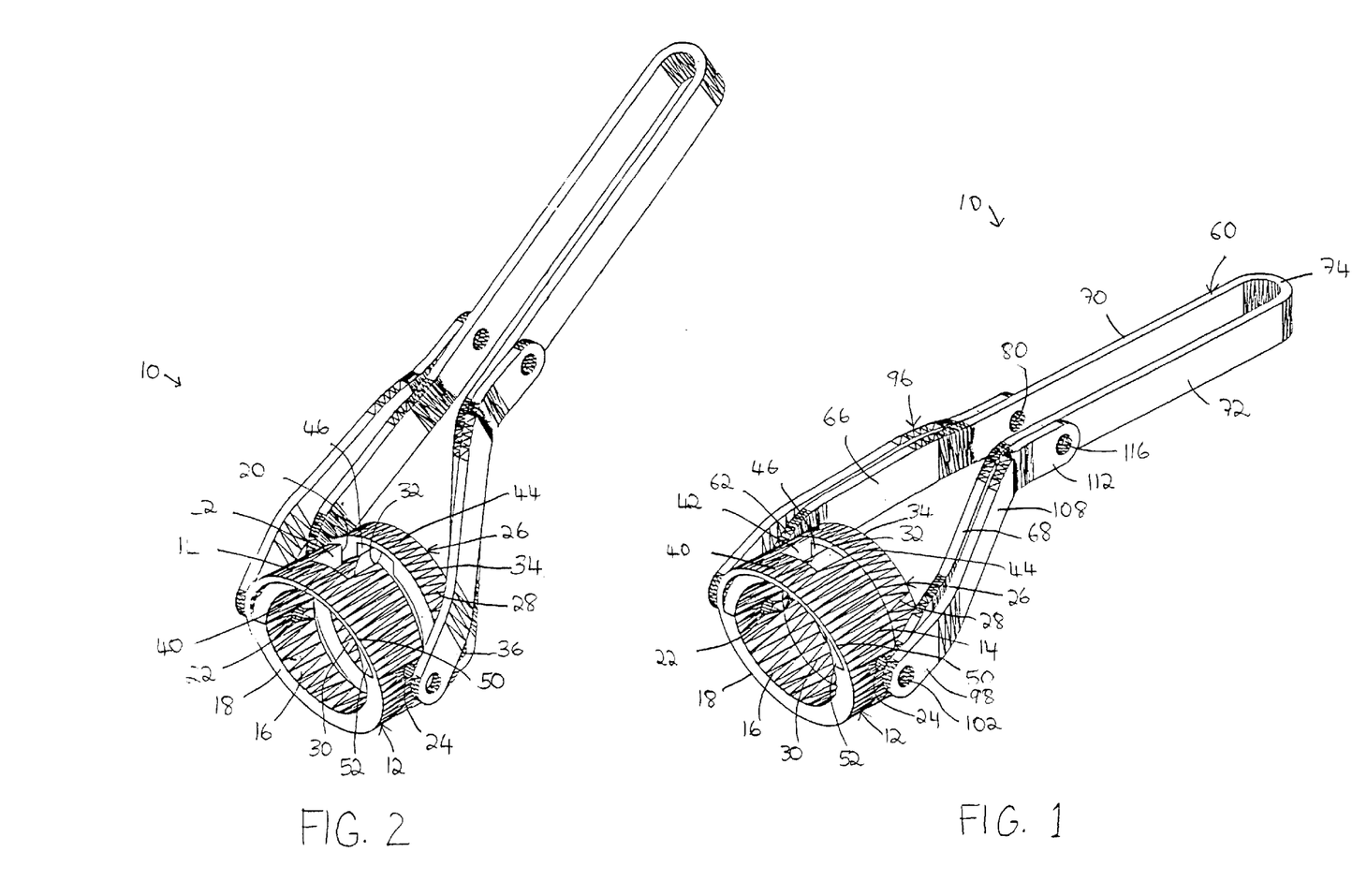
FIG. 1 is a perspective view of the clamp connector and release device of the invention, shown in the closed or connect position.
FIG. 2 is a perspective view of the clamp shown in FIG. 1, in the disconnect position.

With particular reference to FIGS. 1 and 2 of the drawings, a perspective view of a clamp 10 of the invention is shown in each of these Figures, with FIG. 1 showing the clamp 10 in a closed position, when a plug and socket are connected, and with FIG. 2 showing the clamp 10 in an open position, when a plug and socket are disconnected, the clamp 10 having been maneuvered so as to disconnect the plug from the socket.

The clamp 10 comprises a sleeve 12, a ring 26, a handle 60 and a bracket 96, all arranged and connected with respect to each other as will be described.

Figure 8:
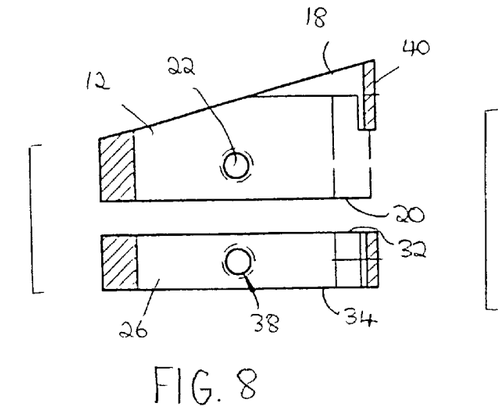
FIG. 8 is a cross-section through the sleeve and clamp of the invention shown in FIG. 7 of the drawings.
Figure 9:
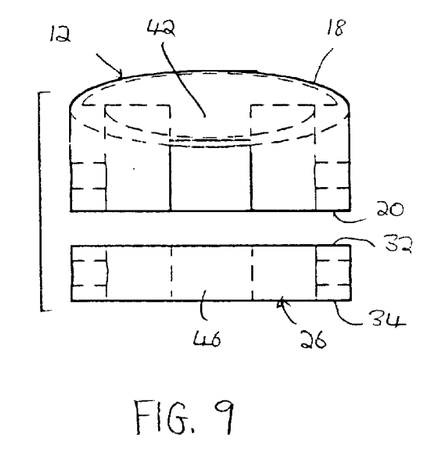
FIG. 9 is an end view of the sleeve and ring of the clamp of the invention shown in FIG. 1 of the drawings.
Figure 10:
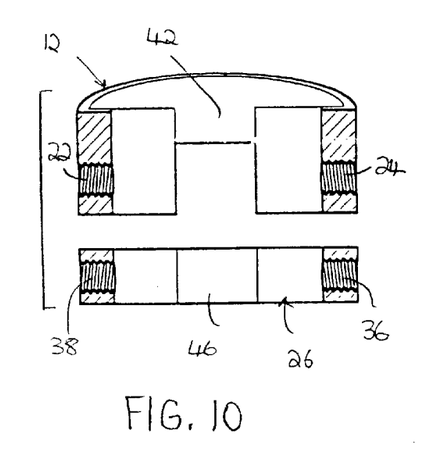
FIG. 10 is a cross-section of the sleeve and ring of the clamp shown in FIG. 9 of the drawings.

The clamp 10 comprises the sleeve 12 which is of substantially cylindrical shape, the sleeve 12 having an outer surface 14, an inner surface 16, a leading end 18 and an inner end 20. The sleeve 12 has two substantially diametrically opposed holes 22 and 24 (see also FIGS. 8 to 10), each of the holes 22 having a threaded inner bore for receiving a bolt, as will be described below.

The clamp 10 further comprises the ring 26, the ring 26 having an outer surface 28, an inner surface 30, an inner end 32, and a trailing end 34. The ring 26 is about circular in shape, and is configured so as to be coaxial with the sleeve 12. In the closed position of the clamp 10, as shown in FIG. 1 of the drawings, the outer surface 14 of the sleeve 12, and the outer surface 28 of the ring 26, form a substantially continuous surface, and are of approximately the same diameter. Likewise, the inner surface 16 of the sleeve 12, and the inner surface 30 of the ring 26, are of substantially the same diameter, and define a flush, continuous surface when in the closed position, as illustrated in FIG. 1 of the drawings.

The ring 26 has a pair of substantially diametrically opposed holes 36 and 38, each of which has an internal bore for receiving a bolt (see again FIGS. 8 to 10), as will be described more fully below.

In the embodiments shown in the drawings, the inner end 20 of the sleeve 12, as well as the inner end 32 and trailing end 34 of the ring 26, are approximately normal to the axis of both the sleeve 12 and ring 26 respectively. However, in the embodiment shown, the leading edge 18 of the sleeve 12 is cut obliquely with respect to the axis of the sleeve 12, and is, in use, designed to engage or abut a correspondingly shaped surface surrounding a plug or socket. It will, however, be appreciated that while an oblique leading end 18 of the sleeve 12 is shown in FIGS. 1 and 2 of the drawings, the particular angle, and even shape, of the leading edge 18 will be determined and configured so as to properly engage the surface surrounding a plug or socket with which the clamp 10 is used. While it may be preferable, in certain circumstances, to shape the leading end 18 of the sleeve 12 according to the surface which it engages, such a shaping is not required by the invention, and any shaped leading end 18 which will engage the surface surrounding the plug or socket in a manner to allow the proper functioning of the clamp 10 will suffice.

At the top 40 of the sleeve 12, there is provided a cut-out portion 42 which is of rectangular shape. The ring 26 has, also at its top 44 a groove or recess 46 which is provided in a portion of the ring 26. The recess 46 is cut from the inner surface 30 of the ring 26, through only a portion of the thickness of the ring 26, such that the outer surface 28 of the ring 26 at the top 44 thereof is not affected by the recess 46.

In the assembled form, to be discussed more fully below, the cut-out portion 42 registers with the recess 46 so as to provide a continuous channel 48, best seen in FIG. 11 of the drawings (but also illustrated in FIGS. 8 to 10), when the sleeve 12 and ring 26 are adjacent each other.

It will be noted that the leading edge 18 of the sleeve 12 is layered in its upper half. Thus, the leading end 18 comprises an oblique surface 50 which forms a continuation of the leading edge 18 in the lower half, and a perpendicular surface 52, which is substantially parallel to the inner surface 20 of the sleeve 12. This may facilitate a connection which could operate with both an angled and a perpendicular shaped connector. However, the leading end 18 may be any shape, as necessary, and may also typically be squared off in its entirety.

Figure 3:
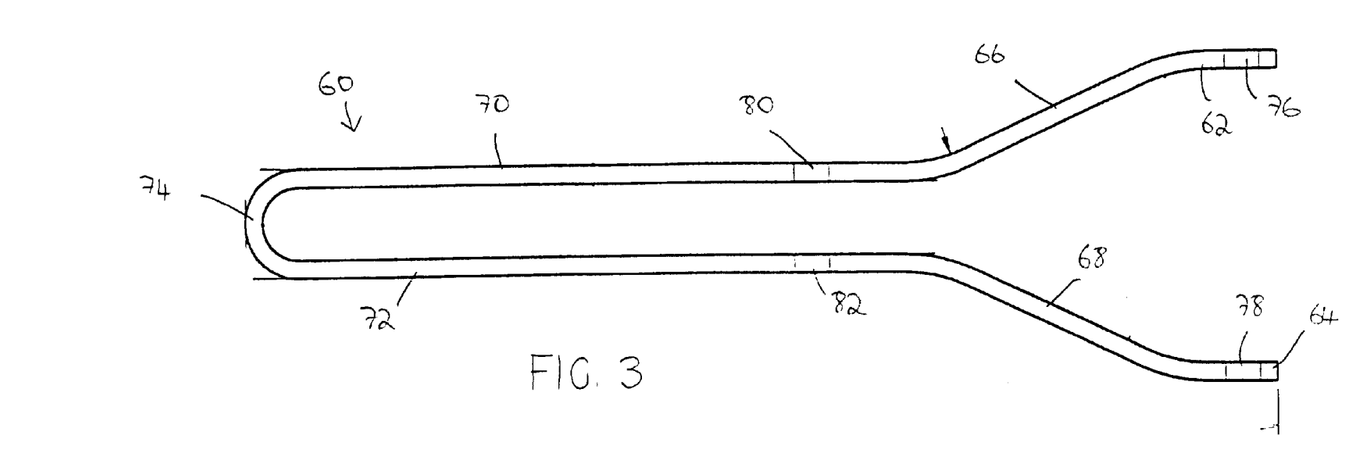
FIG. 3 is a top view of the handle used in the clamp of the invention shown in FIG. 1 of the drawings.

The clamp 10 further comprises a handle 60 designed to connect to the ring 26. The handle 60, best illustrated in FIGS. 3 and 4 of the drawings, comprises a pair of parallel end portions 62 and 64, a pair of tapering mid-portions 66 and 68, and a pair of parallel handle portions 70 and 72. The ends of the handle portions 70 and 72 remote from the parallel end portions 62 and 64 are connected to each other by a U-shaped portion 74 so that the handle 60 constitutes a single unit. The parallel end portions 62 and 64 have apertures 76 and 78, the purpose of which will be described below, while the handle portions 70 and 72 include apertures 80 and 82, also to be described more fully below.

Figure 4:
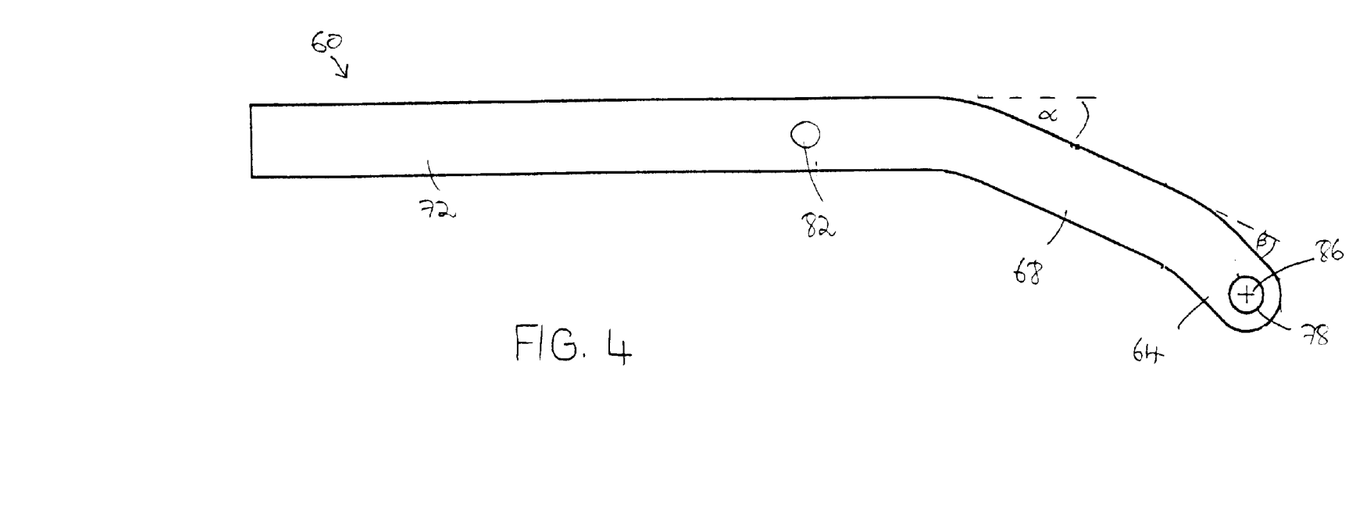
FIG. 4 is a side view of the handle which is shown in FIG. 3 of the drawings.

It will be seen from FIG. 4 of the drawings that the handle 60 is not straight or linear in construction. The tapering mid-portions 66 and 68 are configured at angle $\alpha$ with respect to the handle portions 70 and 72, so as to depend downwardly from these handle portions 70 and 72, while the parallel end portions 62 and 64 are at angle $\beta$ with respect to the tapering mid-portions 66 and 68. The construction of the handle 60 so as to have the handle portions, tapering mid-portions and parallel end portions, configured at these angles facilitates operation of the release function of the clamp 10, to be described more fully below.

In use, the handle 60 is connected to the ring 26. The distance defined between the parallel end portions 62 and 64 is slightly greater than the outer diameter of the ring 26. The apertures 76 and 78 in the parallel end portions 62 and 64 are located so that they register and correspond with the holes 36 and 38 in the ring 26. A bolt 86 (seen in FIGS. 4, 11 and 12) extends through each of unthreaded apertures 76 and 78 in the parallel end portions 62 and 64, and engages with the internally threaded holes 36 and 38 located in the ring. The connection established is such that the handle 60 is able to pivot or rotate about the bolt 86 so that rotational movement of the handle 60 relative to the ring 26 is possible.

Figure 5:
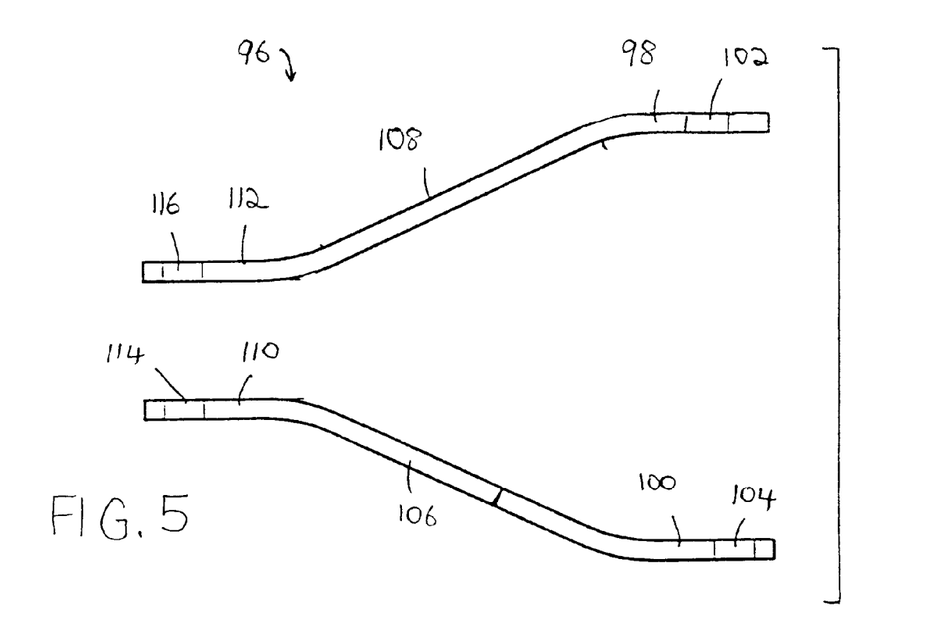
FIG. 5 is a top view of the bracket used in the clamp of the invention shown in FIG. 1 of the drawings.
Figure 6:
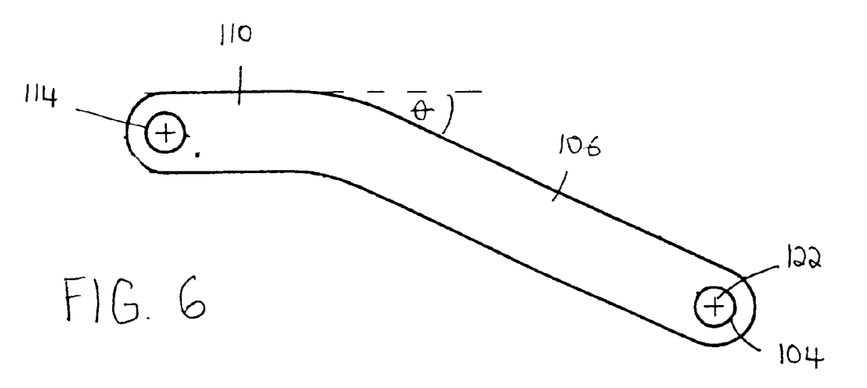
FIG. 6 is a side view of the bracket shown in FIG. 5 of the drawings.
Figure 7:
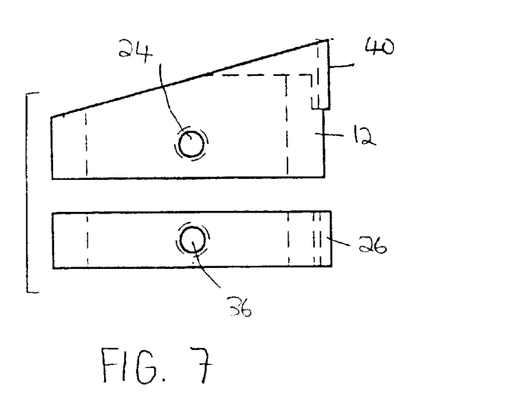
FIG. 7 is a side view of the sleeve and ring of the clamp of the invention shown in FIG. 1 of the drawings.

The clamp 10 of the invention further comprises a bracket 96, best illustrated in FIGS. 5 and 6 of the drawings. The bracket 96 comprises parallel end portions 98 and 100, each of which contains an aperture 102 and 104 respectively. The bracket 96 comprises a pair of tapering mid-portions 106 and 108, and a pair of end portions 110 and 112, each of the end portions having an aperture 114 and 116 respectively. With reference to FIG. 6 of the drawings, it will be noted that the tapering mid-portion 106 is at an angle $\theta$ with respect to the end portion 110. In side view, the tapering mid-portion 106 and parallel end portion 100 are linear, or form a continuous line.

The distance between the parallel end portions 98 and 100 is sufficient so as to straddle both the ring 26 and sleeve 12, as well as the parallel end portions 62 and 64 of the handle 60. This can best be seen in FIGS. 1 and 2 of the drawings. The bracket 96 is connected to the sleeve 12 by passing a bolt 122 (see FIGS. 6, 11 and 12) through each of apertures 102 and 104, the apertures 102 and 104 being aligned with or registering with the holes 24 and 22 respectively in the sleeve 12. A bolt 122 passes through each of the apertures 102 and 104, and is secured within the threaded bore of the holes 22 and 24 so as to firmly secure the bracket 96 to the sleeve 12 of the clamp 10. It should be noted that the bolts 122 securing the bracket 96 to the sleeve 12 are constructed such that the bracket 96 is capable of relative movement with respect to the sleeve 12, so that it can rotate or pivot about the bolt 122.

The bracket 96 is also connected to the handle 60. In this regard, it will be noted that the apertures 80 and 82 in the handle 60 register with the apertures 116 and 114 respectively in the bracket 96, and the handle 60 and bracket 96 are thereby connected by passing a bolt 124 (seen in FIGS. 11 and 12) through apertures 80 and 116 respectively, and another bolt 124 through apertures 82 and 114 respectively. The bolts 124 secure the bracket 96 and handle 60 together such that both the bracket 96 and handle 60 are capable of pivotal or rotational movement relative to each other about the bolts 124 when in the secured position.

The clamp 10 of the invention is intended to facilitate the connection and disconnection between a plug and socket, or to otherwise axially connect electrical, hydraulic or pneumatic components in line, in a cable. It will be seen in FIG. 11 of the drawings that a cable 130 is, in use, secured to the inner surface 30 of the ring 26. The cable 130 has at one end 132 thereof a series of electrical pins, in this particular example, which will connect to a plug or socket in line. The plug or socket, represented in phantom lines by reference numeral 136 in FIG. 11 of the drawings, has a series of female pin receivers 138 intended to receive pins 134 at the end 132 of the cable 130. The plug or socket 136 is connected through appropriate wiring or cable connections to controls, switches, or other device(s) as desired, which may be located in the truck. On the other hand, the cable 130, including the various pins 134, may be located in the trailer being drawn by the truck, and the various electrical pins 134 will branch out to connect to devices in the trailer, such as lighting, air conditioning or the like.

The operation of the clamp 10 of the invention, to be described, facilitates the connection and disconnection between the cable 130, and the plug 136.

Figure 11:
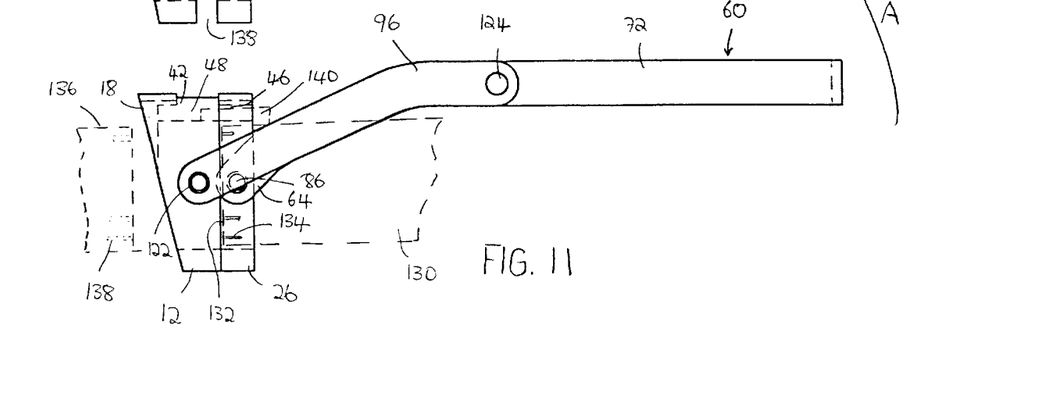
FIG. 11 is a side view of the clamp of the invention shown in the closed or connect position.
Figure 12:
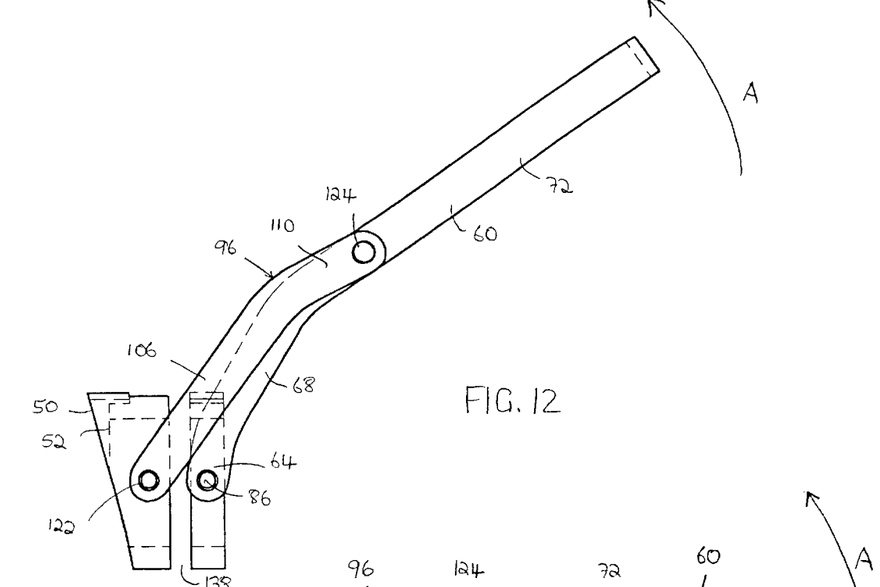
FIG. 12 is a side view of the clamp of the invention shown in FIG. 11 of the drawings, in the disconnect position.

Reference is now made to FIGS. 11 and 12 of the drawings. It will be seen in FIG. 11 that the sleeve 12 and ring 26 are adjacent each other. In this position, the entire clamp 10 is moved forward so that the plug 136 enters the sleeve 12, and an axial connection is formed between the end 132 of the cable and the plug 136. In this way, an electrical coupling is established between the pins 134 and the pin receiver apertures 138. A secure connection is made between the cable 130 and the plug 136 so that even severe truck motions and vibrations will not result in the inadvertent disconnection which could result in a dangerous situation.

The clamp 10 of the invention functions in its most useful form when it is desired to disconnect the end 132 of the cable 130 from the plug 136. Since the axial connection is usually a very firm one, in order to withstand the movement and vibration of machines and vehicles, it is often difficult to pull out the cable 130 from the plug 136. Moreover, the access of an operator may be limited, making it even more difficult to maneuver the cable 130 from the plug 136.

In the clamp 10 of the invention, simple removal of the cable 130 can be achieved as follows. Reference is made to FIG. 12 of the drawings, which shows the handle in the raised position. As the handle 60 is raised, or rotated in the direction indicated by arrow A, from the position shown in FIG. 11 to the position shown in FIG. 12, the handle 60 and bracket 96 pivot relative to each other about the bolt 124. Further, the handle 60, as it moves, pivots about the bolt 86 on the ring 26, and the bracket 96 pivots about bolt 122 on the sleeve 12. Due to the shape and configuration of the handle 60 and bracket 96, as well as their connection with respect to each other, movement of the handle 60 from the position shown in FIG. 11 to the position shown in FIG. 12 results in the ring 26 moving away from the sleeve 12, to create a gap 138 therebetween. The movement of the ring 26 away from the sleeve 12 causes the cable 130 to be pulled back and away from the plug 136, effecting the disconnection. Thus, a simple movement of the handle 60, and the configuration of the clamp 10, provides a mechanical advantage to the user whereby the ring 26 is pulled back from the sleeve 12, requiring much less force, and easy maneuverability, in separating the cable 130 from the plug 136.

It will be appreciated that the reverse operation may also apply, enabling the cable 130 to be connected to the plug 136 by operating the handle 60 so as to close the gap 138 between the ring 126 and the sleeve 12. In an embodiment of the invention, this connection operation may be facilitated by a simple hooking or engagement of the sleeve 12 to the surrounding portions of the plug 136.

In the embodiment shown, the leading edge 18 of the sleeve 12 is oblique or angled, and would typically engage a correspondingly angled housing or portion surrounding the plug 136 to enhance proper connection. As mentioned above, this leading edge 18 may be constructed so as to have any number of oblique angles, as the situation requires, or may simply be flat. In another alternative, this leading edge 18 may have a specific form and shape which matches that of the housing surrounding the plug 136 to which it will be connected.

The cut-out portion 42 in the sleeve 12, and the recess 46 in the ring 26, preferably register with each other to form the channel 48 as shown, and would typically be used to ensure that the cable 130 is properly centered and/or located within the clamp 10 so that when the clamp 10 is used to connect the cable to a plug or socket, the pins 134 and recesses 138 therefor will correctly match. Thus, the cable 130 may include a projection, shown in FIG. 11 in phantom lines and identified by reference numeral 140. FIG. 11 also shows the cut-out portion 42 and recess 46 in the sleeve 12 and ring 26 respectively.

While the clamp 10 of the invention has as an important application thereof the important function of connecting systems between a truck and trailer, the clamp of the invention is certainly not limited to such use. Any inline or axial connection between a plug and socket could benefit from the use of the clamp of the invention. Further, the clamp of the invention could be used for hydraulic, pneumatic or other types of connections and disconnections, and its function is not to be construed as being limited to electrical connections.

Additionally, where the cable, plug and/or socket have other than a circular shape, the sleeve 12 and ring 26 may be appropriately shaped so as to conform to the particular cable and connection arrangement for which it will be used. For example, if the clamp is used in an ordinary household outlet, the sleeve 12 and/or ring 26 may be rectangularly shaped so as to receive a standard residential plug. The clamp can also be used to connect axial cables such as TV or other forms of inline cable, where it is often difficult and cumbersome to separate conventional connections. The clamp of the invention allows increased force to be applied in separating a plug from a socket, but since the force will be appropriately applied by the separation of the sleeve 12 and ring 26 so that the components will not be damaged or broken, the additional force will not be harmful.

The invention is not limited to the precise construction or details described hereabove, and variations within the scope of the claims may be made.

What is claimed is:

1. A clamp for an inline connector having a male and a female component, the clamp comprising:

a first sleeve mentor having a peripheral portion defining an opening for receiving and holding the male or female component, the first sleeve member having a recess therein for centering the male or female component within the opening;

a second sleeve member adjacent the first sleeve member, the second sleeve member having an opening therein which is adjacent the opening in the first: sleeve member;

a handle having a first end pivotally connected to the first sleeve member for rotation about the pivotal connection;

a bracket member pivotally connected to the second sleeve member at one end thereof and pivotally connected to the handle at another end thereof;

wherein rotation of the handle about its pivotal connection to the first sleeve member moves the first sleeve member and the second sleeve member relative to each other between a first position where the first sleeve member and the second sleeve member are closer to each other and a second position where the first sleeve member and the second sleeve member are further apart front each other.

2. A clamp as claimed in claim 1 wherein the first sleeve member is a ring member and defines a circular opening for receiving and holding the male or female component.

3. A clamp as claimed in claim 2 wherein the second sleeve member is of a cylindrical shape and defines a circular opening adjacent the circular opening of the ring member.

4. A clamp as claimed in claim 1 wherein the handle comprises a pair of parallel end portions each of which connect at one end thereof pivotally to the first sleeve member, a pair of tapering portions extending from the end portions, and a pair of parallel handle portions extending from the tapering portions, the handle portions being connected to each other at ends thereof remote from the tapering portions by a U-shaped member.

5. A clamp as claimed in claim 4 wherein each end portion has an aperture therein, the first sleeve member has a pair of threaded bores therein each of which registers with one of the apertures, and a bolt connects the end portion to the first sleeve member by pausing through the aperture of the end portion and threadedly engaging the threaded bore in the first sleeve member.

6. A clamp a claimed in claim 4 wherein the tapering portions are downwardly angled with respect to the handle portions, and the end portions are downwardly angled with respect to the tapering portions.

7. A clamp as claimed in claim 1 wherein the handle includes an aperture therein for use in establishing the pivotal connection between the handle and the bracket member.

8. A clamp as claimed in claim 1 wherein the second sleeve member has a leading edge which is configured so as to engage with a body accommodating the female or male component.

9. A clamp for an inline connector having a male and a female component, the clamp comprising:

a first sleeve member having a peripheral portion defining an opening for receiving and holding the male or female component;

a second sleeve member adjacent the first sleeve member, the second sleeve member having an opening therein which is adjacent the opening in the first sleeve member, the second sleeve member having a cut out portion therein for centering the male or female component within the opening;

a handle having a first end pivotally connected to the first sleeve member for rotation about the pivotal connection;

a bracket member pivotally connected to the second sleeve member at one end thereof and pivotally connected to the handle at another end thereof;

wherein rotation of the handle about its pivotal connection to the first sleeve member moves the first sleeve member and the second sleeve member relative to each other between a first position where the first sleeve member and the second sleeve member are closer to each other and a second position where the first sleeve member and the second sleeve member are further apart from each other.

10. A clump for an inline connector having a male and a female component, the clamp comprising:

a first sleeve member having a peripheral portion defining an opening for receiving and holding the male or female component;

a second sleeve member adjacent the first sleeve member, the second sleeve member having an opening therein which is adjacent the opening in the first sleeve member;

a handle having a first end pivotally connected to the first sleeve member for rotation about the pivotal connection;

a bracket member pivotally connected to the second sleeve member at one end thereof and pivotally connected to the handle at another end thereof, the bracket member comprising a pair of parallel first end portions each of which connects at one end thereof pivotally to the second sleeve member, a pair of tapering portions extending from the end portions, and a pair of parallel second end portions extending from the tapering portions;

wherein rotation of the handle about its pivotal connection to the first sleeve member moves the first sleeve member and the second sleeve member relative to each other between a first position where the first sleeve member and the second sleeve member are closer to each other and a second position where the first sleeve member and the second sleeve member are further apart from each other.

11. A clamp as claimed in claim 10 wherein each first end portion of the bracket member has an aperture therein, the second sleeve member has a pair of threaded bores therein each of which registers with one of the apertures, and a bolt connects the first end portion to the second sleeve member by passing through the aperture of the first end portion and threadedly engaging the threaded bore in the second sleeve member.

12. A clamp as claimed in claim 10 wherein the tapering portions are downwardly angled with respect to the second end portions, and the first end portions are linear with respect to the tapering portions.

13. A clamp as claimed in claim 12 wherein each of the second end portions include an aperture therein for use in establishing the pivotal connection between the handle and the bracket member.

* * * * *